Jan. 9, 1923.
C. S. LOCKWOOD.
ROLLER BEARING AND METHOD OF MAKING SAME.
FILED DEC. 5, 1921.
1,441,691.
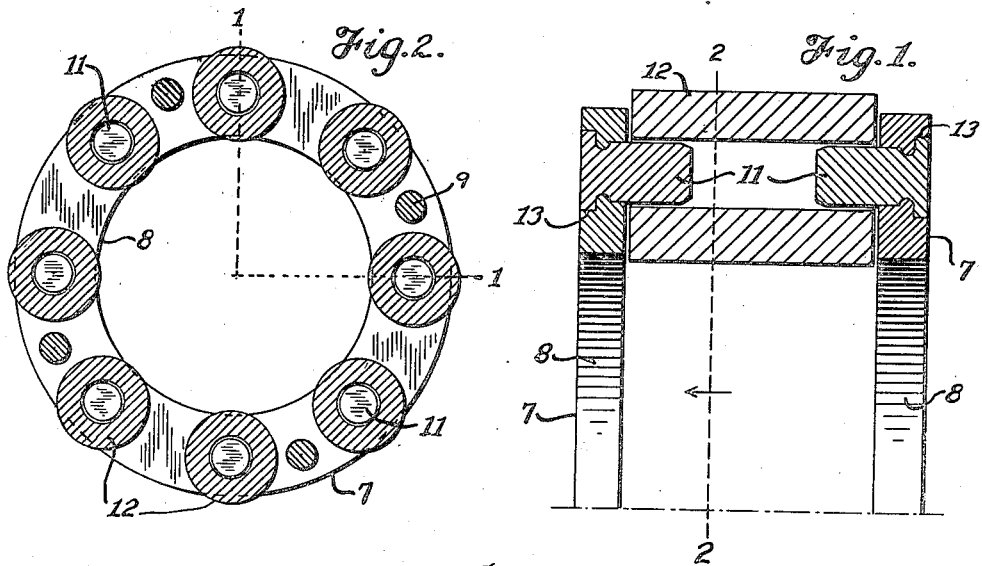
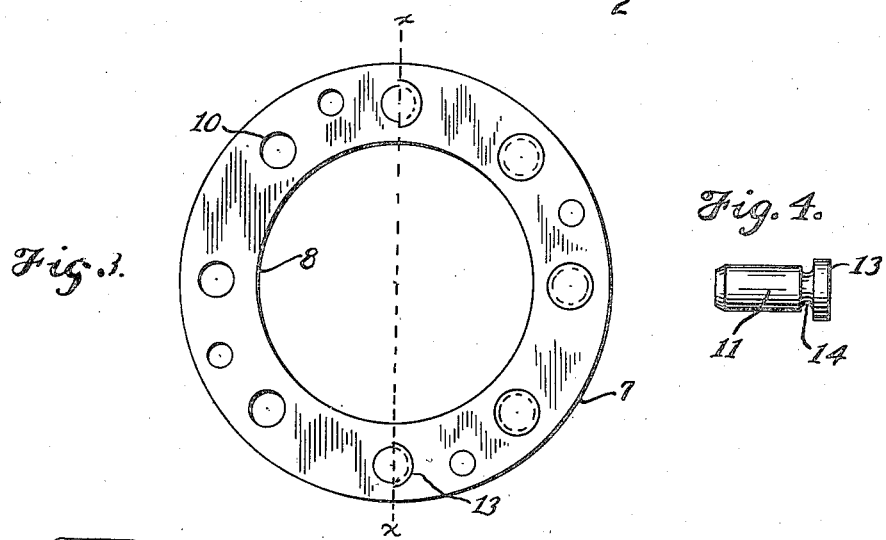
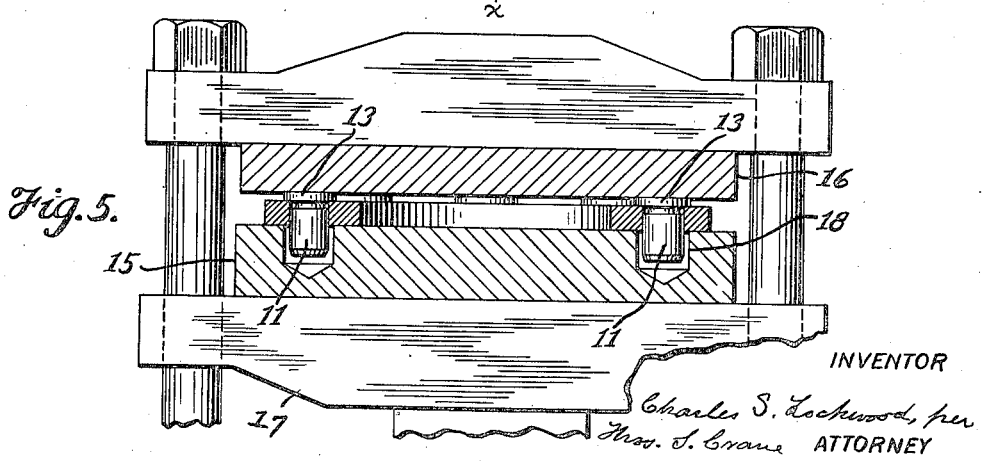
INVENTOR
Charles S. Lockwood, per
Hrv. S. Crane ATTORNEY Patented Jan. 9, 1923.

1,441,691

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER BEARING AND METHOD OF MAKING SAME.

Application filed December 5, 1921. Serial No. 520,149.

*To all whom it may concern:*

Be it known that I, CHARLES S. LOCKWOOD, a citizen of the United States, residing at Newark, county of Essex, and State of New Jersey, have invented certain new and useful Improvements in Roller Bearings and Methods of Making Same, fully described and represented in the following specification and the accompanying drawings, forming a part of the same.

The present invention relates to the manufacture of roller-bearings in which the rolls are mounted between the heads of a rotatable cage, and hollow or tubular rolls are employed, and an annular series of studs provided upon the inner sides of the cagehead to enter the bores of the rolls at their opposite ends.

The heads of such cages are commonly made to rotate freely upon the shaft or spindle which is supported in the bearing, and the engagement of the studs with the rolls carries the rolls in a circular path about the shaft and keeps the rolls parallel with one another, and spaced a little way apart to avoid friction between their adjacent rotating surfaces.

Studs integral with the head have been formed of conical shape, by stamping the studs upon the metal of the cage-heads, but such studs are necessarily made conical in shape to facilitate pressing them from the metal of the heads, and such conical studs bear upon the bore of the rolls only at their extreme ends, with a very limited bearing-surface that is liable to rapid wear, thus diminishing the guiding effect of the studs upon the rolls.

The present invention permits the formation of the studs separate from the heads and of any shape desired, and attaches them thereto by a special process which is described herein, and the studs may therefore be made cylindrical in form and project into the ends of the roll to any desired extent, thus furnishing a large wearing surface for the studs, which with the usual lubrication prevents any material wear.

Cylindrical studs are shown in the annexed drawing, the shank of the studs being fitted snugly to holes in the cage-head, and the outer end of each stud having an integral collar which is pressed into the outer surface of the head and thus locked securely therein.

In the annexed drawing, Fig. 1 is a longitudinal enlarged section of a cage on line 1—1 in Fig. 2 with the rolls secured therein by the studs; Fig. 2 is a view of the inner side of the cage in section on line 2—2 in Fig. 1 with an annular series of studs thereon; Fig. 3 is a view of the outer side of the cage with the left-hand half showing the sockets prepared to receive the shanks of the studs, and the other half of the view showing the collars of the studs as they are forced into the metal of the head; Fig. 4 is a side-view of one of the studs adapted to fit the socket in the head; and Fig. 5 is a vertical section of the means for pressing the collars of the studs into the heads.

The heads 7 are flat disks with hole 8 in the center to turn loosely upon the shaft or axle. Two such heads form the cage when connected by tie-bars 9.

A shown in Fig. 3, the heads are provided with an annular series of sockets 10 to receive the stud shanks 11 spaced apart suitably to engage the ends of the rolls 12 as shown in Fig. 2.

The outer ends of the studs are formed each with an integral collar 13, and are shown in Fig. 1 pressed into the outer sides of the heads until they are flush therewith.

As the collars are forced into the heads, the metal beneath the collar is displaced, as shown in Fig. 1, and a clearance for it is made by forming a groove or neck 14 in the shank of the stud contiguous to the collar, into which groove the displaced metal is forced.

Such crowding of the parts together secures the studs very cheaply to the head, as the shanks of all the studs, to any desired number may be inserted at one time in the sockets 10, and all of the collars upon such heads forced at once into the head by dies 15 and 16, which would be acted upon simultaneously by the platen 17 of a hydraulic press, as shown in Fig. 5.

The lower die 15 is shown with a bore 18 to receive each of the studs while permitting its pressing inwardly, such die supporting the head rigidly during the pressing operation.

Fig. 1 shows the collars pressed into the head, while Fig. 5 shows the shanks of the studs inserted in the holes of the plate in readiness for the dies to press the collars inwardly, as desired.

Any number of such dies may be inserted in a hydraulic press at the same time, within its capacity to receive them; and as all of the collars would be pressed into the heads simultaneously, the labor and time required in furnishing the heads with the studs is almost nominal.

By making the studs separate from the heads they may be made of harder metal, or hardened and tempered so as to greatly increase their wearing ability. Such hardness does not interfere with the operation of the process described, which requires the displacement of the metal of the cage-head and not upon the stud.

By this invention a cage of the highest durability may be secured without material cost.

Having thus set forth the nature of the invention what is claimed herein is:

1. In a roller-bearing, the combination, with a series of tubular rolls, of heads having each a series of inserted studs projected from their inner sides into the ends of the said rolls, the studs having each a collar larger than the body of the stud embedded in the metal of the head.

2. In the manufacture of roller-bearings, the process of forming a cage-head with an annular series of inserted studs, consisting first, in forming the studs each with an integral collar at one end, second, forming the cage-head with a series of sockets for the insertion of the stud shanks with the collars bearing upon the outer side of the cage-head, and finally, forcing the collars into the metal of the head upon the outer side thereof.

In testimony whereof I have hereunto set my hand.

CHARLES S. LOCKWOOD.